US009516130B1

(12) United States Patent
Graham-Cumming

(10) Patent No.: US 9,516,130 B1
(45) Date of Patent: Dec. 6, 2016

(54) CANONICAL API PARAMETERS

(71) Applicant: CLOUDFLARE, INC., San Francisco, CA (US)

(72) Inventor: John Graham-Cumming, London (GB)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 14/857,735

(22) Filed: Sep. 17, 2015

(51) Int. Cl.
*H04L 29/08* (2006.01)
*H04L 29/06* (2006.01)

(52) U.S. Cl.
CPC .......... *H04L 67/2842* (2013.01); *H04L 67/42* (2013.01)

(58) Field of Classification Search
CPC .............................. H04L 67/2842; H04L 67/42
USPC ......................................................... 709/213
See application file for complete search history.

(56) References Cited

U.S. PATENT DOCUMENTS

| | | | |
|---|---|---|---|
| 6,983,280 B2* | 1/2006 | Cheung | G06F 17/30864 |
| 7,509,431 B2* | 3/2009 | Singhal | H04L 67/2823 |
| | | | 709/230 |
| 7,730,154 B2* | 6/2010 | Agarwalla | H04L 29/06 |
| | | | 709/217 |
| 7,761,500 B1* | 7/2010 | Eckert | H04L 67/2814 |
| | | | 709/203 |
| 8,204,999 B2* | 6/2012 | Crosbie | G06F 17/30867 |
| | | | 709/223 |
| RE44,207 E * | 5/2013 | Schneider | G06F 17/30887 |
| | | | 709/217 |
| 8,595,752 B1* | 11/2013 | Fioravanti | G06F 9/541 |
| | | | 709/203 |
| 8,886,686 B2* | 11/2014 | Barton | 707/759 |
| 8,977,704 B2* | 3/2015 | Liu | 709/213 |
| 9,015,166 B2* | 4/2015 | Chow | G06F 17/241 |
| | | | 707/705 |
| 9,015,284 B2* | 4/2015 | Ukkola | H04L 67/02 |
| | | | 709/217 |
| 9,037,580 B2* | 5/2015 | Brown | G06F 17/30654 |
| | | | 706/12 |
| 9,037,618 B2* | 5/2015 | Srinivasaraghavan | 707/822 |
| 9,081,861 B2* | 7/2015 | Lloyd | G06F 17/30876 |
| 9,141,717 B2* | 9/2015 | Schneider | G06F 17/30887 |
| 9,183,265 B2* | 11/2015 | Ryman | G06F 17/30569 |
| 2005/0210000 A1* | 9/2005 | Michard | G06F 17/30398 |
| 2009/0063538 A1 | 3/2009 | Chitrapura et al. | |
| 2010/0131487 A1 | 5/2010 | Lopez et al. | |
| 2011/0137888 A1 | 6/2011 | Yoo et al. | |
| 2012/0198043 A1* | 8/2012 | Hesketh | H04L 29/1265 |
| | | | 709/223 |
| 2013/0124545 A1* | 5/2013 | Holmberg | G06F 17/30244 |
| | | | 707/756 |

(Continued)

*Primary Examiner* — Melvin H Pollack
(74) *Attorney, Agent, or Firm* — Nicholson De Vos Webster & Elliott LLP

(57) ABSTRACT

A caching system receives a request Uniform Resource Identifier (URI) that includes multiple parameters. The request URI is modified to create a canonical request URI including: ordering the parameters by name while keeping a relative order of any of the parameters that have a same name but different value; normalizing a case of the parameters; and removing any of the parameters that are determined to have no effect on a resource that corresponds to the request URI. The modified request URI is hashed thereby creating a hash value. The hash value is used to determine whether the resource that corresponds to the request URI is available in cache.

15 Claims, 3 Drawing Sheets

(56) References Cited

U.S. PATENT DOCUMENTS

| | | | |
|---|---|---|---|
| 2013/0144836 A1* | 6/2013 | Adzic | G06F 17/30876 707/634 |
| 2015/0135295 A1* | 5/2015 | Sample | H04L 67/22 726/7 |
| 2015/0295983 A1* | 10/2015 | Hu | G06F 9/54 719/329 |
| 2015/0347480 A1* | 12/2015 | Smart | G06F 17/30333 707/743 |

* cited by examiner

CANONICAL API PARAMETERS

FIELD

Embodiments of the invention relate to the field of network communications; and more specifically, to creating canonical API parameters.

BACKGROUND

Many simple request hashing schemes hash a request Uniform Resource Identifier (URI) including its parameters. For example, web caches may identify cached resources through hashing request URIs. However, hashing request URIs (including their parameters) may result in different hashes for what are semantically the same URI. For example, consider the following search API: https://api.example.com/search?q=<querystring>&limit=<n>&start=<n>. This URI has three parameters (name/value pairs): q, limit, and start. The order of these three parameters is not significant. Thus, the URI https://api.example.com/search?q=<querystring>&limit=<n>&start=<n> is semantically the same as the URI https://api.example.com/search?q=<querystring>&start=<n>&limit=<n>. That is, these two URIs are essentially the same content request and result in the same content response. However, hashing these two URIs will produce two different hashes. In the case of a web cache, the web cache may needlessly store two copies of the same response for these two different URIs.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A method and apparatus for generating canonical API parameters is described. In one embodiment, a received request URI with multiple parameters is converted into a canonical URI. For instance, the parameters may be reordered in a predefined and consistent way such as in alphabetical or lexicographical order. If the URI includes multiple parameters that have the same name, the relative order of those API parameters may be maintained. Any meaningless parameters may be removed from the URI (e.g., those parameters that do not change the response). Any meaningless characters and/or whitespace may be removed from the URI (e.g., those characters and/or whitespace that do not affect the response) may be removed from the URI. The case of the parameters may be normalized to the same case (e.g., upper or lower case). The resulting URI (referred herein as a canonical URI) may be hashed and will obtain a higher cache hit ratio for cacheable API requests.

Figure 1:
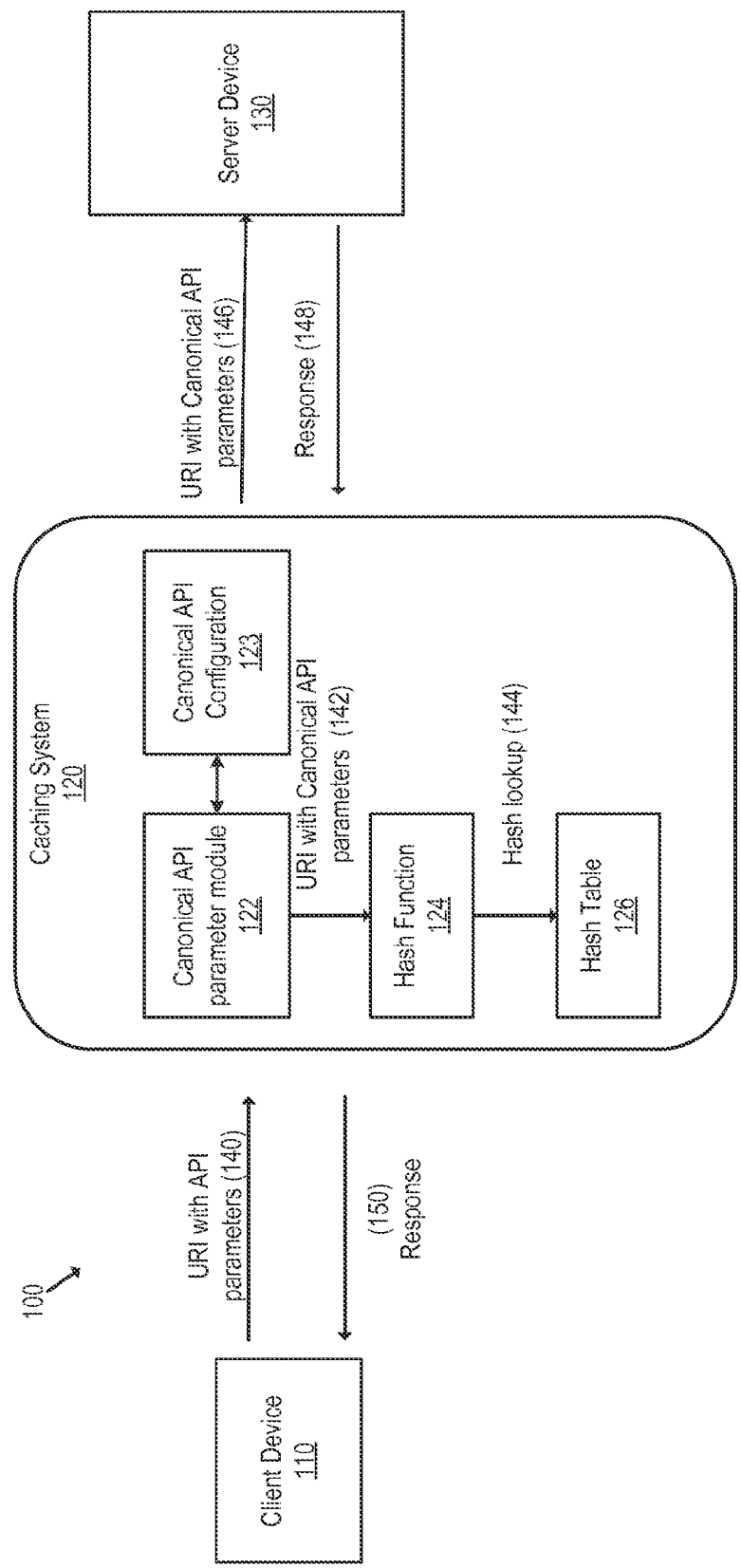
FIG. 1 illustrates an exemplary system according to some embodiments described herein.

FIG. 1 illustrates an exemplary system for generating a canonical URI according to one embodiment. The system 100 includes the client device 110 that transmits a request URI with API parameters 140 that is received by the caching system 120. The client device 110 may be any computing device that is capable of transmitting request URIs (e.g., laptop, desktop, mobile phone, smartphone, gaming system, wearable device, tablet, etc.). The client device 110 may transmit the request URI in an HTTP request, for example. It should be understood that the use of the term "client device" herein does not require that the device be an end-user client device.

The caching system 120 receives the request URI 140 from the client device 110. The caching system 120 may be a set of one or more computing devices that operate a cache of web resources that can respond to the request URI with a resource from its cache if certain conditions are met (e.g., a cached version of the requested resource is available and not expired). The caching system 120 may be implementing a forward cache or a reverse cache. In a specific embodiment, the caching system 120 is used in a content delivery network (CDN) that stores copies of web content at multiple places in the network. The caching system 120 may receive the request URI 140 as a result of a Domain Name System (DNS) request for the domain of the URI resolving to an IP address of the caching system 120. In some embodiments, multiple domains that may be owned by different domain owners may resolve to the same caching system 120 (e.g., the same IP address or a different IP address of the caching system 120).

The caching system 120 includes the canonical API parameter module 122 that is configured to canonicalize the API parameters included in the request URI 140. For example, and as described in greater detail later herein, the canonical API parameter module 122 may reorder the API parameters in a predefined and consistent way (e.g., alphabetical or lexicographical order), may remove meaningless API parameters that do not change the corresponding response; and/or may normalize the case of the API parameters. The canonical API parameter module 122 may use configuration defined in the canonical API configuration 123. For instance, the canonical API configuration 123 may define what, if any, API parameters are considered meaningless for a particular domain. The canonical API configuration 123 may define whether to perform the canonicalization for the domain of the request URI. The canonical API configuration 123 may define the preferences of the canonicalization such as which canonicalization technique(s) to use, the order in which they are used, etc. The configuration may be defined by an administrator or domain owner corresponding to the domain of the request URI.

After canonicalizing the API parameters, the URI with the canonical API parameters 142 is hashed by the hash function 124 to generate a hash value. The resulting hash value may be used in a hash lookup 144 in the hash table 126 to determine whether the requested resource is available in cache. If a Bloom Filter is used when determining whether the requested resource is in cache, multiple hashes may be generated from the canonical API parameters 142 and fed into the Bloom Filter. Since the URI parameters have been canonicalized, a higher cache hit ratio for cacheable API requests may be experienced. In addition, since the URI parameters have been canonicalized, the cache may store less copies of the same resource.

If the requested resource is in cache and certain other conditions are met (e.g., the cached resource has not expired), the caching system 120 responds to the client device 110 with the response 150 that includes the cached resource. If the requested resource is not in cache or other conditions are not met, the caching system 120 retrieves the requested resource. For instance, the caching system 120 transmits a request for the resource towards the server device 130. The server device 130 may be the origin server for the domain of the resource. In one embodiment, this transmitted request identifies the request URI with the canonical API parameters 146. In another embodiment, this transmitted request identifies the request URI 140 where the API parameters are not canonicalized. In either embodiment, if the server device 130 has access to the requested resource, then the server device 130 responds with the resource in the response 148. After receiving the response 148, the caching system 120 stores the requested resource in cache. In the embodiment where the request identified the request URI with the canonical API parameters 146, the caching system 120 associates the returned resource with the hash of the request URI 146. In an embodiment where the request to the server device 130 identified the request URI 140 (where the API parameters are not canonicalized), the caching system 120 canonicalizes the API parameters of the request, performs a hash of the now canonicalized request URI, and associates the returned resource with the resulting hash value. The retrieved resource is also returned to the client device 110 in the response 150.

The system illustrated in FIG. 1 refers to using the canonical URI for caching purposes. However, it should be understood that the canonical URI can be used for other purposes instead of, or in addition to, caching. Generally, the canonical URI can be used in any system or technique that uses a URI. For instance, the canonical URI can be used for accounting/statistical purposes to determine popularity of URIs. As another example, the canonical URI can be used to identify a page to apply delta compression. As another example, the canonical URI can be used for simplified blocking in a web application firewall. As another example, the canonical URI can be used as part of a fingerprint for a client device (since the order may be different from client device to client device).

Figure 2:
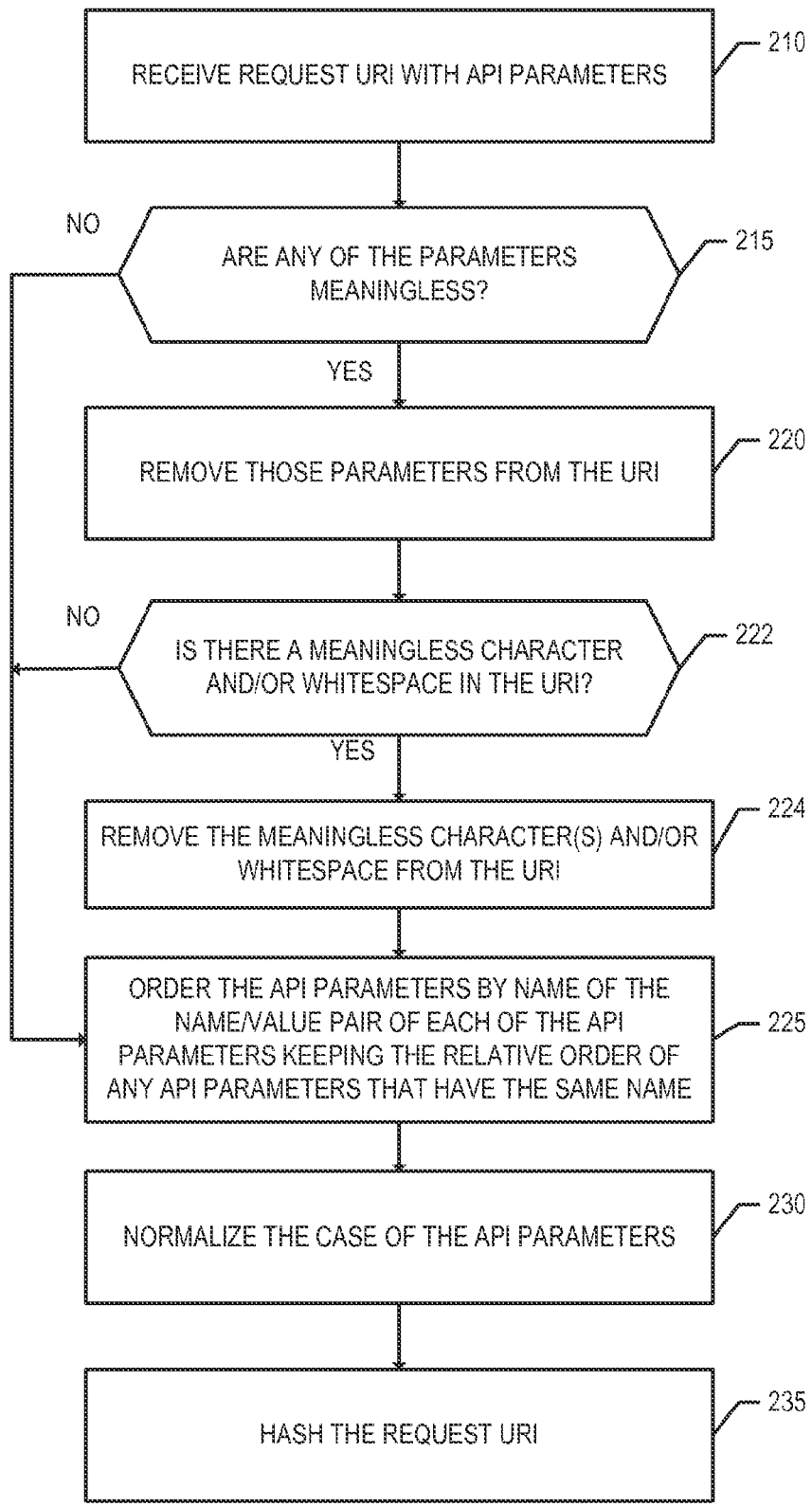
FIG. 2 is a flow diagram that illustrates exemplary operations for generating a canonical URI according to one embodiment.

FIG. 2 is a flow diagram that illustrates exemplary operations for generating a canonical URI according to one embodiment. The operations of FIG. 2 will be described with respect to the exemplary embodiment of FIG. 1. However, it should be understood that the operations of FIG. 2 can be performed by embodiments different than those discussed with reference to FIG. 1 and the embodiments described with reference to FIG. 1 can perform operations different than those of FIG. 2.

At operation 210, a request URI that includes multiple API parameters is received at the caching system 120. Throughout the description of FIG. 2, the following example URI will be described: https://api.example.com/search?q=john&D=10&start=0&q=doe&D=10. This URI includes four parameters (q=john; D=10; start=0; and q=doe). Next, at operation 215, the caching system 120 determines whether any of the parameters in the received URI are meaningless. As used herein, a meaningless parameter will not change the corresponding response. For example, some servers may apply a default value to a parameter if a value other than the default is not specified in the URI. In these situations, the response will be the same if that parameter with the default value is provided in the URI as if the parameter is not included in that URI. In the URI example, the parameter "start=0" is a meaningless parameter because the default value for "start" is "0" and will not have an effect on the corresponding response. In one embodiment, to determine whether there are any meaningless parameters, the caching system 120 accesses a configuration that defines which parameters are meaningless and may define the default values for those parameters. For instance, using the example URI, the configuration may define that the parameter with the name "start" and value "0" is meaningless. In an embodiment, this configuration is set by the owner or operator of the domain. In another embodiment, the caching system 120 learns over time which parameters are meaningless by examining requests and responses.

If there are no meaningless parameters in the request URI, then flow moves to operation 225. If there is at least one meaningless parameter in the request URI, then flow moves to operation 220. At operation 220, the caching system 120 removes the meaningless parameter(s) from the request URI. For instance, the parameter "start=0" is removed from the request URI. Flow then moves to operation 222.

The parameter values and/or URI may include one or more meaningless characters and/or whitespace. For example, quotation marks surrounding a parameter value may be meaningless and may mean the same regardless of the quotation marks. For instance, the parameter "D=10" may mean the same as the parameter "D="10"". As another example, whitespace may be meaningless. Thus, at operation 222, the caching system 120 determines whether the URI includes a meaningless character and/or whitespace in the request URI. In an embodiment, to determine whether there is a meaningless character or whitespace in the URI, the caching system 120 accesses a configuration that defines which character(s) and/or whitespace are meaningless and checks the URI for such character(s) and/or whitespace. In an embodiment, this configuration is set by the owner or operator of the domain. In another embodiment, the caching system 120 learns over time which character(s) and/or whitespace are meaningless by examining requests and responses. If there is not a meaningless character or whitespace in the request URI, then flow moves to operation 225. If there is at least one meaningless character and/or whitespace in the request URI, then flow moves to operation 224 where the caching system 120 removes the meaningless character(s) and/or whitespace from the request URI. Flow then moves to operation 225.

The order of the parameters of the request URI may not be significant, with an exception of when the parameter name is repeated in the request URI. Thus, at operation 225, the caching system 120 orders the parameters by name of the name/value pair of each of the parameters while keeping the relative order of any parameter that has the same name. The ordering may be done differently in different embodiments, but is done consistently. For example, the ordering may be done in alphabetical ordering, reverse alphabetical ordering, lexicographical ordering, reverse lexicographical ordering, or other ordering. For instance, the three remaining parameters may be ordered as follows "D=10"; "q=john"; and "q=doe". Since "q=john" and "q=doe" have the same parameter name, the relative order of those parameters is maintained (that is, the parameter "q=john" remains before "q=doe" since that is the relative order of the request URI). After ordering the parameters, flow then moves to operation 230.

The casing of the parameters of the request URI is typically not significant. Thus, at operation 230, the caching system 120 normalizes the case of the API parameters. For instance, the caching system 120 may cause each parameter to be in all upper case; all lower case; or any consistent casing. For the example of FIG. 2, the caching system 120 puts all the parameters into lower case. Thus, the parameter "D=10" is changed to "d=10".

Flow then moves to operation 235 where the modified request URI, which has been canonicalized, is hashed at least once. The hash value(s) are then used to determine whether the requested resource is available in cache. If the resource is available in cache, the caching system 120 retrieves the resource from cache and can return the cached resource to the requesting device. If the resource is not available in cache, the caching system 120 retrieves the resource from the origin server, associates the returned resource with the hash of the modified request URI, and returns the requested resource to the requesting device.

Figure 3:
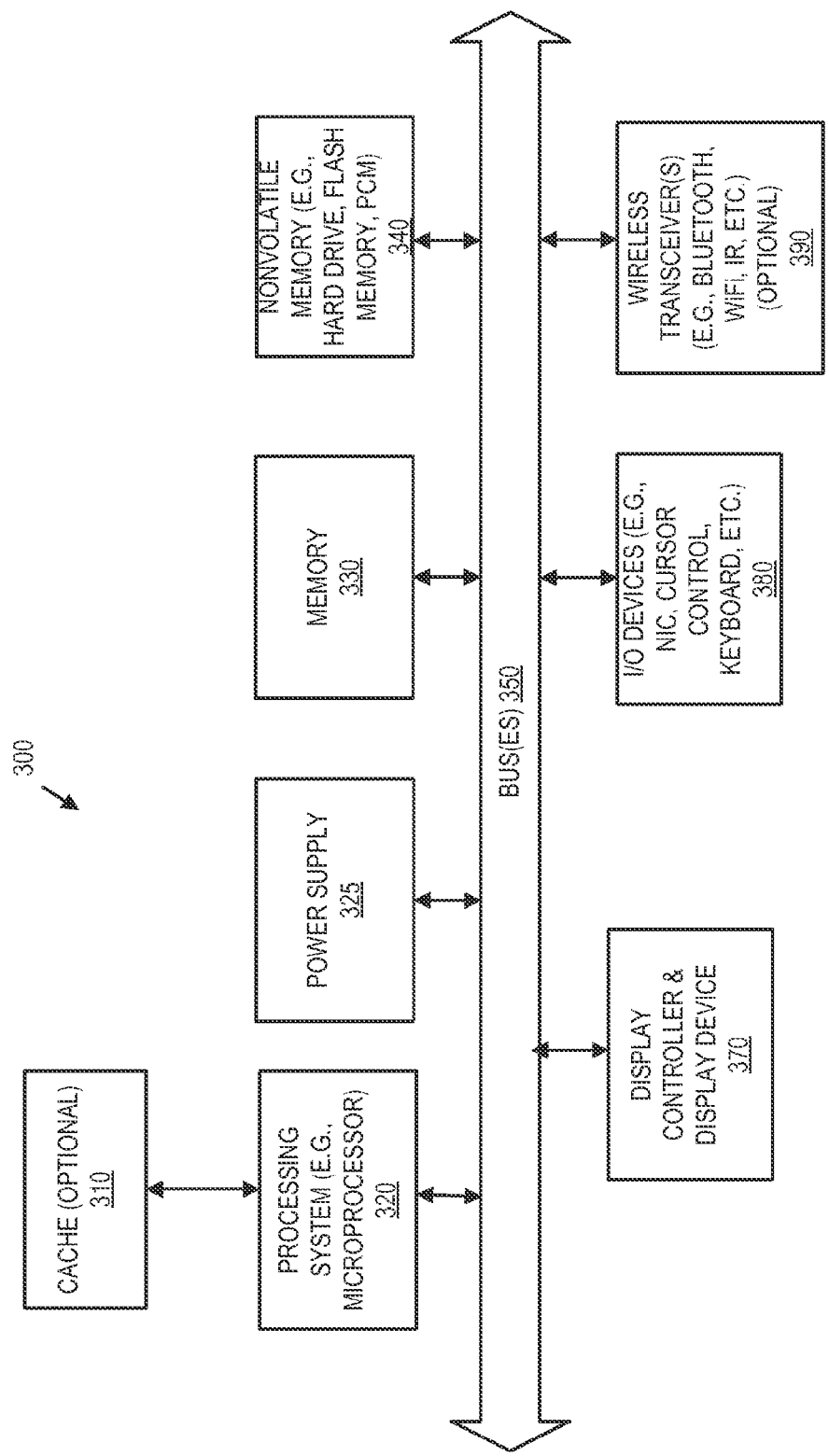
FIG. 3 illustrates an exemplary format of a computer system that may be used according to some embodiments.

As illustrated in FIG. 3, the computer system 300, which is a form of a data processing system, includes the bus(es) 350 which is coupled with the processing system 320, power supply 325, memory 330, and the nonvolatile memory 340 (e.g., a hard drive, flash memory, Phase-Change Memory (PCM), etc.). The bus(es) 350 may be connected to each other through various bridges, controllers, and/or adapters as is well known in the art. The processing system 320 may retrieve instruction(s) from the memory 330 and/or the nonvolatile memory 340, and execute the instructions to perform operations described herein. The bus 350 interconnects the above components together and also interconnects those components to the display controller & display device 370, Input/Output devices 380 (e.g., NIC (Network Interface Card), a cursor control (e.g., mouse, touchscreen, touchpad, etc.), a keyboard, etc.), and the optional wireless transceiver(s) 390 (e.g., Bluetooth, WiFi, Infrared, etc.). In one embodiment, the client device, caching system, and/or service device described herein may take the form of the computer system 300.

The techniques shown in the figures can be implemented using code and data stored and executed on one or more computing devices (e.g., client devices, servers, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a caching system, comprising:
receiving a request Uniform Resource Identifier (URI) that includes a plurality of parameters;
modifying the request URI to create a canonical request URI including performing the following:
ordering the plurality of parameters by name while keeping a relative order of any of the plurality of parameters that have a same name but different value;
normalizing a case of the plurality of parameters;
removing any of the plurality of parameters that are determined to have no effect on a resource that corresponds to the request URI;
removing any meaningless character from the request URI; and
removing any meaningless whitespace from the request URI;
hashing the modified request URI to create a hash value; and
determining, using the hash value of the modified request URI, whether the resource that corresponds to the request URI is available in cache through a lookup using the hash value of the modified URI.

2. The method of claim 1, further comprising:
responsive to determining that the resource that corresponds to the request URI is not available in cache, performing the following:
retrieving the resource;
returning the resource to a source of the request, and associating the resource in cache with the hash value.

3. The method of claim 1, further comprising:
responsive to determining that the resource that corresponds to the request URI is available in cache, performing the following:
retrieving the resource from cache, and
returning the resource to a source of the request.

4. The method of claim 1, further comprising:
accessing a configuration file that defines one or more parameters that have no effect on the resource to determine that there is at least one parameter that has no effect on the resource.

5. The method of claim 1, wherein the ordering of the plurality of parameters is done by one of alphabetical order and lexicographical order.

6. A non-transitory machine-readable storage medium that provides instructions that, when executed by a processor, cause said processor to perform operations comprising:
receiving a request Uniform Resource Identifier (URI) that includes a plurality of parameters;
modifying the request URI to create a canonical request URI including performing the following:
ordering the plurality of parameters by name while keeping a relative order of any of the plurality of parameters that have a same name but different value;
normalizing a case of the plurality of parameters;
removing any of the plurality of parameters that are determined to have no effect on a resource that corresponds to the request URI;
removing any meaningless character from the request URI; and
removing any meaningless whitespace from the request URI;
hashing the modified request URI to create a hash value; and
determining, using the hash value of the modified request URI, whether the resource that corresponds to the request URI is available in cache through a lookup using the hash value of the modified URI.

7. The non-transitory machine-readable storage medium of claim 6 that provides further instructions that, when executed by the processor, cause said processor to perform operations comprising:
responsive to determining that the resource that corresponds to the request URI is not available in cache, performing the following:
retrieving the resource;
returning the resource to a source of the request, and
associating the resource in cache with the hash value.

8. The non-transitory machine-readable storage medium of claim 6 that provides further instructions that, when executed by the processor, cause said processor to perform operations comprising:
responsive to determining that the resource that corresponds to the request URI is available in cache, performing the following:
retrieving the resource from cache, and
returning the resource to a source of the request.

9. The non-transitory machine-readable storage medium of claim 6 that provides further instructions that, when executed by the processor, cause said processor to perform operations comprising:
accessing a configuration file that defines one or more parameters that have no effect on the resource to determine that there is at least one parameter that has no effect on the resource.

10. The non-transitory machine-readable storage medium of claim 6, wherein the ordering of the plurality of parameters is done by one of alphabetical order and lexicographical order.

11. A caching system, comprising;
a processor;
a non-transitory machine-readable storage medium coupled with the processor that stores instructions that, when executed by the processor, cause said processor to perform the following:
receive a request Uniform Resource Identifier (URI) that includes a plurality of parameters;
modify the request URI to create a canonical request URI including performing the following:
order the plurality of parameters by name while keeping a relative order of any of the plurality of parameters that have a same name but different value;
normalize a case of the plurality of parameters;
remove any of the plurality of parameters that are determined to have no effect on a resource that corresponds to the request URI;
remove any meaningless character from the request URI; and
remove any meaningless whitespace from the request URI;
hash the modified request URI to create a hash value; and
determine, using the hash value of the modified request URI, whether the resource that corresponds to the request URI is available in cache through a lookup using the hash value of the modified URI.

12. The caching system of claim 11, wherein the non-transitory machine-readable storage medium further stores instructions that, when executed by the processor, cause said processor to perform the following:
responsive to a determination that the resource that corresponds to the request URI is not available in cache, perform the following:
retrieve the resource;
return the resource to a source of the request, and
associate the resource in cache with the hash value.

13. The caching system of claim 11, wherein the non-transitory machine-readable storage medium further stores instructions that, when executed by the processor, cause said processor to perform the following:
responsive to a determination that the resource that corresponds to the request URI is available in cache, perform the following:
retrieve the resource from cache, and
return the resource to a source of the request.

14. The caching system of claim 11, wherein the non-transitory machine-readable storage medium further stores instructions that, when executed by the processor, cause said processor to perform the following:
access a configuration file that defines one or more parameters that have no effect on the resource to determine that there is at least one parameter that has no effect on the resource.

15. The caching system of claim 11, wherein the ordering of the plurality of parameters is done by one of alphabetical order and lexicographical order.

* * * * *